A. V. ROE.
STRUT CONNECTION.
APPLICATION FILED NOV. 2, 1917.
1,301,748.
Patented Apr. 22, 1919.
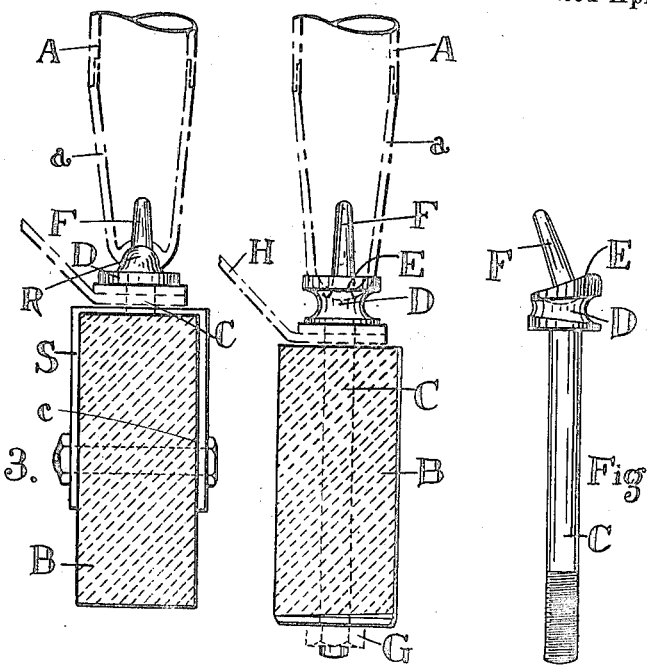
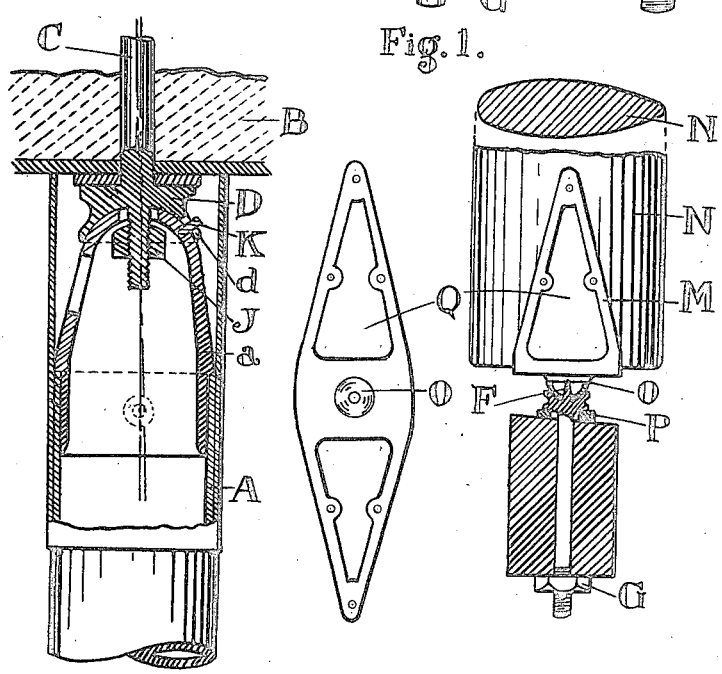
Fig. 4.   Fig. 6.   Fig. 5.
Elliott Verdon Roe,
Inventor,
By Geo. A. Hutchinson,
Attorney.

UNITED STATES PATENT OFFICE.

ALLIOTT VERDON ROE, OF HAMBLE, ENGLAND.

STRUT CONNECTION.

1,301,748.   Specification of Letters Patent.   Patented Apr. 22, 1919.

Application filed November 2, 1917.   Serial No. 199,975.

*To all whom it may concern:*

Be it known that I, ALLIOTT VERDON ROE, a subject of the King of Great Britain, and resident of Hamble, Southampton, England, have invented certain new and useful Improvements in Strut Connections, of which the following is a specification.

This invention relates to improvements in the means of connecting a compression strut to a structure to be stayed.

The invention is more particularly applicable to light structures and it is especially adapted for use on aircraft.

Difficulties occur in connection with aircraft by reason of the sloping angles of the surfaces which frequently require to be connected thereon, and one object of the invention is to allow of the connection of a strut to such sloping surfaces; another object of the invention is to provide a connection for the strut which will allow of a variation in the angular position of the strut proceeding to the connection, and the bracing attachments proceeding therefrom, without need of alteration to the other elements of the connection; a further object is to provide a small and neat bracing attachment which enables head resistance to be reduced to a minimum; and other objects will appear from the particular description hereinafter set forth.

These objects are attained by the mechanism illustrated in the accompanying drawings, which show the connection of a compression strut to the spar of a wing in an aeroplane, or as similarly applied, in the compression members of a fuselage.

Figure 1 shows an upright connection for a compression strut with a concave seating for same; Fig. 2 shows the seating bolt detached with a slanting pin; Fig. 3 shows a strut connection with a convex seating and an angle plate connection to the spar; Fig. 4 illustrates a strut socket with a bolt and threaded pin; Fig. 5 illustrates the invention as applied to a timber strut with streamline form; and Fig. 6 is a development of the part of the strut connection on the strut itself.

Referring first to Figs. 1 and 2, A is a tubular strut which it is desired to secure to a spar B; to this end, the bolt C is provided a socket head D with a concave seating E, from which projects the pin F, the whole being secured by the nut G. The bolt C may also secure bracing brackets H for tension wires.

Preferably the strut A will be constructed with a detachable end a, and, whether integral or divided, it will be provided with a hole in its extreme end which is passed over the pin F as the end a reaches its seating E. The complete joint is then held in place by means of the tension wire, or wires, on the brackets H, such a strut usually being subject to compression only.

Fig. 2 shows a variation of the joint to take a slanting strut, that is, with the pin F also slanted.

Fig. 3 is a view showing the converse of Fig. 1 when the end a of the strut A is formed with a concave depression having a hole through it, the seating on the head D in this case being in the form of a dome R from which the pin F projects through the hole in the end a, being attached to the spar B by an angle plate S to the top of which the pin C is riveted; the plate S may then be attached by a bolt c through the neutral axis of the spar B.

Fig. 4 illustrates the case of a bolt C as in Fig. 1, with socket head D having the pin F threaded at its upper end in order to take a nut J which will prevent detachment of the strut A if it comes under tension instead of compression. The hole shown in the hollow seating member of the strut allows of the insertion of the nut, and of a finger, or a spanner for holding or turning same.

In any of these cases, the end a of the strut may advantageously be provided with a projecting peg, for instance, a screw such as K which occupies a slot d in the edge of the head D so that the strut is prevented from rotating relatively to D, although free to tip slightly in the direction of the slot.

Fig. 5 is a view partly in section showing a bracket M attached to a timber streamline strut N, which bracket M is depressed at its center to form the hollow projecting dome O, which thus takes the place of the end a of the tubular strut and into which passes the pin F as before.

In any of these cases, where required to be fixed in a line with the axis of the strut socket bolt, a tapered washer such as P may be employed, thicker at one side than the other, and, by using a variety of these washers the strut may be readily applied to a spar of any usual degree of angular face. As shown in Fig. 6, the bracket M is conveniently adapted for production by stamping, the holes Q (for lightening) and the dome O being easily produced by this means in large quantities.

An advantage is present in each form of the invention in that it is conveniently adapted for machine production in large quantities, and consequently cheaply; it thus obviates a considerable difficulty which is current at the present time in providing a strut socket which will meet the varying conditions of application, whether in the framing of aircraft or in the interior construction of the body parts, such as the fuselage.

While I have described in the foregoing specification the construction of parts as applied to a particular member on an aeroplane, I am aware that numerous changes of construction and operation may be made without departing from the spirit and scope of the invention, and I, therefore, do not wish to be understood as limiting myself by the positive terms employed in connection with the description, excepting such as the state of the art may require.

I claim:—

1. A strut connection comprising a semi-spherical or parti-spherical seating and means of attaching same to the structure to be stayed, in combination with a pin projecting from the said seating and adapted to enter a perforated seating member on the strut, whereby some angular variation in the position of the strut may be obtained without disturbance to other elements of the mechanism.

2. A strut connection comprising a semi-spherical or parti-spherical seating and means for attaching same to the structure to be stayed, in combination with a pin rigidly attached to said seating and projecting therefrom to enter a perforation in the extremity of the strut, and a bracing attachment or attachments anchored directly beneath said seating.

3. A strut connection comprising a semi-spherical or parti-spherical seating and means of attaching same to the structure to be stayed, in combination with a threaded pin rigidly attached to said seating and adapted to enter a perforated hollow seating member on the strut, a nut upon said threaded pin, for the purpose of retaining said strut upon its seating, and a hole in said hollow seating member for the purpose of reaching said nut.

4. A strut connection comprising in combination a semi-spherical or parti-spherical seating and means for attaching same to the structure to be stayed, a pin projecting from said seating and adapted to enter a perforated seating member on the strut, a slot located in the semi-spherical or parti-spherical portion of said seating, and a pin projecting from the seating member on said strut to engage said slot, substantially as and for the purpose set forth.

In testimony whereof I affix my signature.

ALLIOTT VERDON ROE.